(12) United States Patent
Dams et al.

(10) Patent No.: US 6,231,055 B1
(45) Date of Patent: May 15, 2001

(54) SEALED ARTICLE

(76) Inventors: Francis Dams, Buizegemlei 46/1, 2650 Edegem (BE); Dirk Roosen, Meendijk 50, 3300 Tienen (BE)

(*) Notice: Subject to any disclaimer, the term of this patent is extended or adjusted under 35 U.S.C. 154(b) by 0 days.

(21) Appl. No.: 09/194,492

(22) PCT Filed: May 27, 1997

(86) PCT No.: PCT/GB97/01430

§ 371 Date: Nov. 25, 1998

§ 102(e) Date: Nov. 25, 1998

(87) PCT Pub. No.: WO97/45904

PCT Pub. Date: Dec. 4, 1997

(30) Foreign Application Priority Data

May 31, 1996 (GB) .................................................. 9611371

(51) Int. Cl.⁷ ........................................................ F16J 15/02
(52) U.S. Cl. ........................ 277/904; 277/602; 277/616; 277/630; 277/642; 277/651
(58) Field of Search ..................................... 277/904, 602, 277/616, 627, 630, 642, 921, 651

(56) References Cited

U.S. PATENT DOCUMENTS 4,751,350 * 6/1988 Eaton ...................................... 174/87
5,251,373   10/1993 DeCarlo et al. ....................... 29/870
5,622,642 * 4/1997 Edwards et al. ...................... 174/87

FOREIGN PATENT DOCUMENTS

| 3715945 | 1/1988 | (DE) | H02G/3/22 |
| 0538009A | 11/1995 | (EP) | H02G/1/14 |
| WO 90/05401 | 5/1990 | (WO) | H02G/15/18 |
| WO 92/05603 | 4/1992 | (WO) | H01R/4/60 |
| WO 95/06347 | 3/1995 | (WO) | H02G/15/013 |
| WO 96/09483 | 3/1996 | (WO) | F16J/15/02 |

* cited by examiner

*Primary Examiner*—Anthony Knight
*Assistant Examiner*—Enoch E Peavey
(74) *Attorney, Agent, or Firm*—Myers Bigel Sibley & Sajovec

(57) ABSTRACT

An article includes an object and a sealing member. The object includes a cavity formed therein. The sealing member includes sealant and a carrier to which the sealant is attached. At least one of the carrier and the object includes attachment means whereby the carrier is configured to be attached to the object such that at least a portion of the sealant is retained within the cavity.

30 Claims, 3 Drawing Sheets

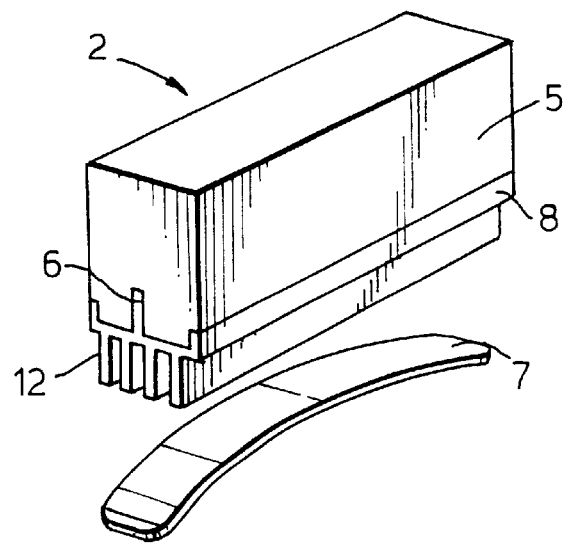
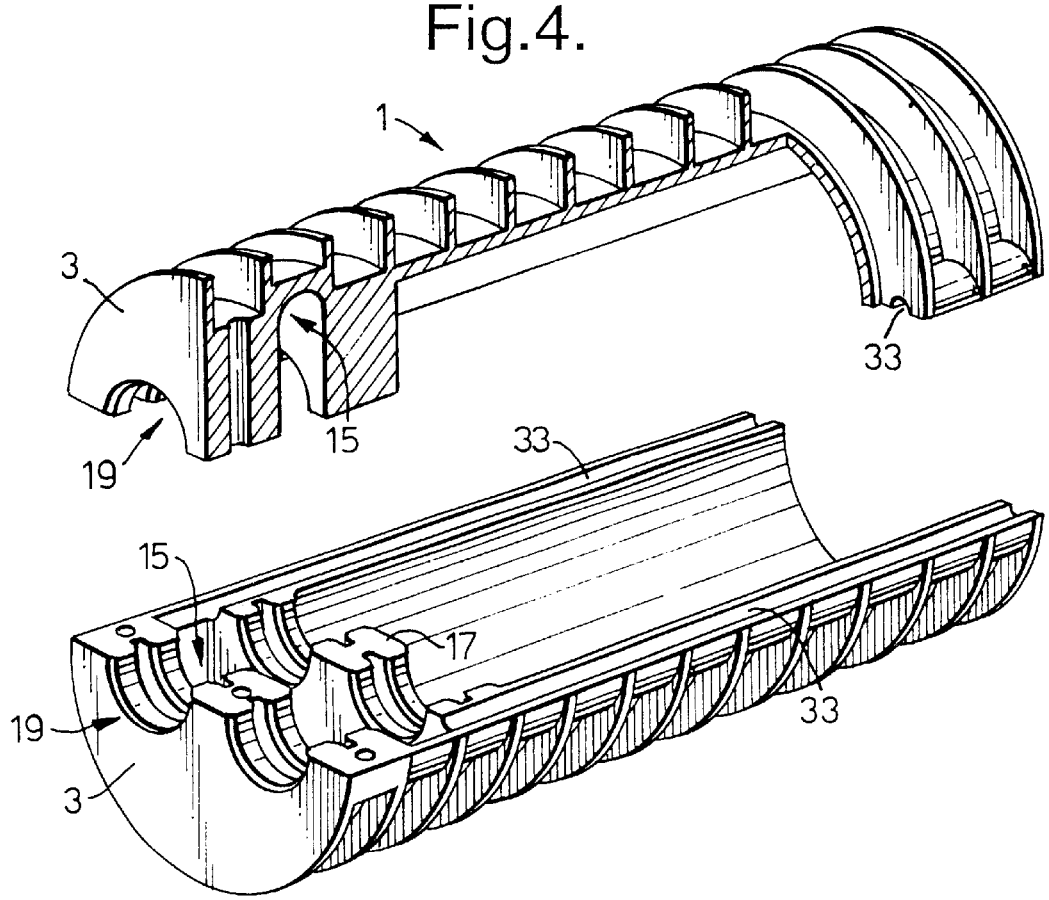

SEALED ARTICLE

The present invention relates to sealed articles, especially containers, e.g. for containing electrical conductors, electrical connections, electronic devices, optical fibres, optical devices or the like. Preferred aspects of the invention relate to cable closures, e.g. cable splice closures for enclosing splices between cables. In this specification, by a "cable" is meant a telecommunications cable (either conductive or optical fibre) an electrical cable or other conductive cable, a wire or other conductor, or an optical fibre.

BACKGROUND OF THE INVENTION

International Patent application WO 96/09483 (Raychem) discloses, inter alia, a sealing member comprising an elongate tubular carrier carrying an elongate body of gel sealant. The sealing member includes a formation, preferably integral with the carrier, for attaching the carrier to an object which is to carry the article in use. The formation may, for example, comprise a projection with an enlarged region receivable in an aperture in the object, to anchor the carrier to the object.

In the formation of seals, it is often necessary to provide sealant in a cavity. For example, when sealing around windows or doors, sealant may be required in a cavity in the window, door, window frame or door frame. Also, when containers, e.g. cable closures, are sealed, there may be one or more cavities in which sealant may need to be provided.

SUMMARY OF THE INVENTION

According to a first aspect, the invention provides an article comprising:
  (a) an object which includes a cavity; and
  (b) a sealing member, comprising:
    (i) sealant; and
    (ii) a carrier, to which the sealant is attached;
the carrier and/or the object including one or more attachment means whereby, at least in use, the carrier is attached directly to the object such that at least some of the sealant is retained within the cavity.

The invention has the advantage that the sealant of the sealing member may be conveniently and firmly retained in a cavity by virtue of the fact that the sealing member includes a carrier which carries the sealant, and the carrier and/or the object include attachment means by which the carrier may be attached to the object.

As already mentioned, the article may, for example, comprise a container, in which case the object may advantageously comprise at least part of a housing of the container. The container may, for example, be suitable for containing electrical conductors and/or electrical connections and/or electronic devices and/or optical fibres and/or optical devices or the like. The container may, for example, comprise a cable closure.

According to a second aspect, the invention provides a cable closure, comprising:
  (a) a housing which includes an opening and a cavity, through each of which, in use, at least one cable may extend; and
  (b) a sealing member, comprising:
    (i) sealant; and
    (ii) a carrier, to which the sealant is attached;
the carrier and/or the housing including one or more attachment means whereby, at least in use, the sealing member is attached directly or indirectly to the housing such that at least some of the sealant is retained within the cavity.

The second aspect of the invention has the advantage that because the sealing member includes a carrier which carries the sealant, and the carrier and/or the housing include attachment means by which the sealing member may be attached directly or indirectly to the housing, the provision of the correct quantity of sealant, the correct positioning of the sealant, and also ease of provision of sealant in the cavity, may generally be assured. The invention, for example, substantially removes the necessity of injecting, pouring or moulding sealant into the cavity (which processes can be difficult and inaccurate). Furthermore, the retention of the sealant in the cavity by means of the attachment means has the advantage that accidental removal or other unwanted movement of the sealant from or in the cavity may generally be avoided. This may be particularly advantageous, for example, if the cable closure is re-opened once in use. If the sealant were not securely retained in the cavity, such re-opening might cause dislodging of the sealant, leading to possible ineffective subsequent sealing and/or contamination.

The sealing member of the cable closure according to the second aspect of the invention is preferably attached to the housing by the carrier being attached directly to the housing by means of the attachment means.

The sealant of the sealing member (according to any aspect of the invention) may generally comprise any suitable sealant. A particularly preferred sealant is gel sealant. The gel may, for example, comprise silicone gel, urea gel, urethane gel, thermoplastic gel, or any suitable gel or gelloid sealant. The most preferred type of gel sealant comprises a liquid-extended polymer composition. The polymer composition of the gel sealant may, for example, comprise an elastomer, or a block copolymer having relatively hard blocks and relatively elastomeric blocks. Examples of such copolymers include styrene-diene block copolymers, for example styrene-butadiene or styrene-isoprene diblock or triblock copolymers e.g. as disclosed in International Patent Application WO 88/00603. Preferably, however, the polymer composition comprises one or more styrene-ethylene-propylene-styrene block copolymers. The extender liquids employed in the gel preferably comprise oils. The oils may be hydrocarbon oils, for example paraffinic or napthenic oils, synthetic oils for example polybutene or polypropene oils, or mixtures thereof. The preferred oils are mixtures of non-aromatic paraffins and naphthenic hydrocarbon oils. The gel may contain additives, e.g. such as moisture scavengers (e.g. Benzoyl chloride), antioxidants, pigments and fungicides.

Other sealants which may be used include polymeric (e.g. silicone) foam materials, elastomeric materials, e.g. natural or synthetic rubber, or mastics. These other sealants are, however, generally less preferred (at least at the present time) than gel sealants.

The sealant (preferably gel sealant) preferably has a hardness at room temperature as determined using a Stevens-Volland Texture Analyser of greater than 45 g, particularly greater than 50 g, especially greater than 55 g, e.g. between 55 g and 60 g. It preferably has a stress-relaxation of less than 12%, particularly less than 10% and especially less than 8%. Ultimate elongation, also at room temperature, is preferably greater than 100%, more preferably greater than 600%, especially greater than 1000%, particularly greater than 1400%, as determined according to ASTM D638. Tensile modulus at 100% strain is preferably at least 1.8 MPa more preferably at least 2.2 MPa. In general compression set is preferably less than 35%, more preferably less than 25%, especially less than 15%. Preferably, the sealant has a cone penetration as measured by ASTM D217 of at least 80 ($10^{-1}$ mm), more preferably at least 100 ($10^{-1}$ mm), even more preferably at least 200 ($10^{-1}$ mm) and preferably no greater than 400 ($10^{-1}$ mm), especially no greater than 350 ($10^{-1}$ mm).

The carrier and the object or housing preferably have attachment means comprising mutually interlocking parts. The attachment means may, for example, be one or more projections and/or recesses. The mutually interlocking parts may advantageously comprise snap-fit parts. Preferably, the sealing member may be attached to the object or housing merely by pushing it into the cavity until the snap-fit parts mutually interlock. The carrier, or at least the attachment means thereof, is/are preferably resiliently deformable.

The carrier is preferably made from a plastics material. Preferred materials include polyolefins, e.g. polyethylene or polypropylene.

The carrier may advantageously comprise a backing or other support of the sealing member, to which the sealant is attached. The carrier may include, for example, one or more protrusions or other gripping members which extend into, and anchor the carrier to, the sealant. The carrier is preferably substantially rigid. It may, for example, have one or more ribs or other stiffening means to ensure its rigidity. The carrier may be generally in the form of a strip, or a tape, or a block or the like. The sealing member may be generally in the form of a strip, a tape, or a block or the like.

According to a third embodiment, the invention provides a sealing member, comprising:

(i) sealant; and (ii) a carrier, to which the sealant is attached;

the carrier comprising a backing of the sealing member, in the form of a strip, tape or block which includes one or more attachment means adapted to attach the sealing member to an object.

According to some preferred embodiments of the invention, the sealing member is able to move with respect to the object or housing when it is attached thereto. The sealing member may, for example, be able to move with respect to the object or housing in a direction further into, and a direction towards the exterior of, the cavity. Most preferably, the article or cable closure may further comprise at least one resilient member which, at least in use, is contained in the cavity and which is compressed, in use, by movement of the sealing member with respect to the object or housing in at least one direction.

In preferred embodiments of the invention, the housing (i.e. the housing of a cable closure or other container) comprises at least two housing parts which may be brought together (e.g. around at least one cable), whereupon the sealing member is automatically moved with respect to the housing, thereby compressing the or each resilient member and causing it, by its resilience, to apply a compressive force to the sealant.

One advantage of this is that a compressive force may be applied to the sealant merely by bringing the housing parts together. It thus avoids the necessity of subsequently moving a pressure plate (e.g. towards the cable(s)) in order to apply such a compressive force to the sealant, thereby reducing the complexity (and enabling a reduction in the cost) of the closure or other container compared to certain prior art closures or other containers and also simplifying the installation procedure compared to the procedure required for such closures or other containers. The need to simplify (and thus to shorten) the installation procedure and the tooling needed for installation, and also the need to reduce the costs associated with manufacturing closures, are becoming increasingly important.

There are a number of reasons why applying a compressive force to the sealant by a resilient member in the cavity may be advantageous. One reason is that, at least in preferred embodiments, the resilient member may urge the sealant into sealing contact with cable(s) extending into the closure or into sealing contact with electrical connections etc. in the container. Another reason is that, at least for some preferred sealants, e.g. gels, the sealing properties are often improved when the sealants are put under compression. The closure or other container may be required to remain sealed for long periods of time (e.g. months, or more typically, years), and during these time periods it will normally be subjected to wide fluctuations in temperature. It is generally for these reasons that the sealant is put under compression by a resilient member, i.e. a member which will normally apply biased compression to the sealant. This has the advantage that changes in the volume of the sealant (e.g. due to changes in temperature) and/or creep, exudation etc. of the sealant are normally automatically accommodated by the resilience of the resilient member, while maintaining the compressive force on the sealant. Due to its resilience, the resilient member preferably expands or contracts automatically as appropriate in the relevant direction in response to expansion, contraction or loss of sealant, and thus it substantially maintains its compression on the sealant.

The or each resilient member of the cable closure of the invention is preferably compressed in a direction which is substantially lateral, more preferably substantially perpendicular, to the direction in which the cable(s) extend(s) through the cavity. Additionally or alternatively, the or each resilient member is preferably situated, in use, laterally spaced apart from the or each cable, e.g. between the sealant and a said housing part. The or each resilient member is preferably compressed, upon closing the housing parts around the cable(s), by the carrier of the sealing member, preferably between the carrier and one or more housing parts.

The or each resilient member may advantageously comprise at least one spring, preferably at least one leaf spring and/or helical spring. The resilient member(s) may further comprise at least one plate or other component which transfers the compressive force from the or each spring to the sealant. Additionally or alternatively, the or each resilient member may be formed at least partly from at least one resilient polymeric material, preferably an elastomer, more preferably a natural or a synthetic rubber (e.g. silicone rubber). The resilient polymeric material may, for example, comprise a polymeric foam material. A particularly preferred form of resilient member comprises a tube or other hollow resilient polymeric member. The or each resilient member may be an integral part of at least one of the housing parts, but preferably is separate from, and insertable into, the housing part(s).

In preferred embodiments, the closure further comprises at least one gripping member for griping one or more cable(s) extending, in use, through the cavity. The gripping member(s) preferably secure(s) the cable(s) with respect to the housing part(s). The or each gripping member preferably attaches directly to the housing parts, or at least one of the housing parts.

Advantageously, the or each gripping member may be in the form of a strip which, in use, is wound around one or more cable(s) and which preferably interlocks with at least one of the housing parts when the housing parts are brought together. The strip may, for example, be a retention strip as disclosed in International Patent Application No. PCT/GB95/02229 (the entire disclosure of which is incorporated herein by reference). i.e. The strip may comprise a retention strip for winding around an elongate object (e.g. one or more cable(s)), which when so wound in use can decrease in length when compressed around the object, thereby allowing contraction of the strip around the object.

The retention strip may comprise one or more, preferably a plurality, of collapsible portions, and the strip can preferably decrease in length due to the collapsing of one or more of the collapsible portions. The collapsible portion(s) may collapse by means of any of a variety of mechanisms, for example by telescoping (in a manner similar to a collapsible telescope). Preferably, however, the or each collapsible portion can collapse by deforming, e.g. by being crushed or concertinaed or by buckling. The or each collapsible portion thus preferably comprises a relatively weak portion of the retention strip, and more preferably comprises one or more webs extending between substantially non-collapsible portions, e.g. one or more relatively thin portions which can be deformed.

Preferably, the retention strip comprises a plurality of alternately collapsible and non-collapsible portions along at least part, preferably all, of the length thereof. This has the advantage of normally providing substantially uniform collapsibility along the length of the strip, such that the strip may contract relatively or substantially uniformly around one or more cables.

The housing parts which provide the cavity for containing the sealant preferably also substantially enclose a cable splice when brought together in use, i.e. the or each cavity for containing the sealing material is preferably provided as an integral part of the housing parts of a cable splice closure. This has the advantage of providing a very simple but extremely reliably sealed cable splice closure. The housing parts are preferably two half-shells which may be secured together. Additionally or alternatively, the housing parts may be joined prior to being brought together in use, e.g. hinged or otherwise pivotally joined. The housing parts may, for example, be integrally joined, e.g. by means of one or more so-called living hinges. The housing parts are preferably made from a plastics material, e.g. polypropylene, but other materials, e.g. metal, could be used.

The or each cavity provided for the sealant by the housing parts is preferably defined by at least two spaced-apart walls of at least one, preferably each, housing part, which walls are preferably integral with the rest of the housing parts. The walls preferably have at least one opening therein, to permit one or more cables to extend through the cavity. Alternatively, portions of the walls may be cut-away or otherwise removed as and when required, in order to provide the necessary opening(s). To this end, the walls may have frangible portions and/or interlocking removable portions, for example.

In particularly preferred embodiments of the invention, the closure further comprises one or more elongate sealing member(s) which, in use, seal(s) between opposed edge faces of the housing parts, and which preferably also sealingly contact(s) the sealant in the cavity. By such sealing contact with the sealant in the cavity, the so-called triple points of the closure (i.e. those points at which, for example, an end seal meets a longitudinal seal between opposed edge faces of the housing parts) may be sealed.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

BRIEF DESCRIPTION OF THE DRAWINGS

The invention will now be described, by way of example, with reference to the accompanying drawings, of which:

FIG. 2 is an illustration of another sealing member, and a resilient member, according to the invention;

FIG. 4 is an illustration of two housing parts of a cable closure according to the invention.

DETAILED DESCRIPTION OF THE PREFERRED EMBODIMENTS

Figure 1A:
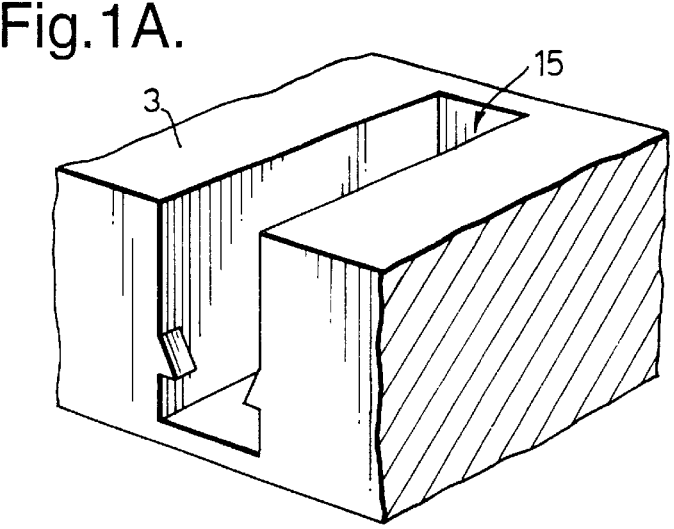
FIG. 1 is a schematic illustration of a sealing member being inserted into a cavity, in accordance with the invention.

FIGS. 1(A to C) is a schematic illustration of a sealing member 2 according to the invention being inserted into a cavity 15 of an object 3, in accordance with the invention. The sealing member 2 comprises a block of sealant 5 (preferably gel sealant) and a carrier 4, to which the sealant 5 is attached. The carrier comprises a backing of the sealing member 2, in the form of a strip. The carrier has a protrusion 6 which extends into, and anchors the carrier to, the sealant. The carrier also has attachment means 8, at the sides thereof, which are arranged to interlock with attachment means 10 in the cavity 15.

Figure 1B:
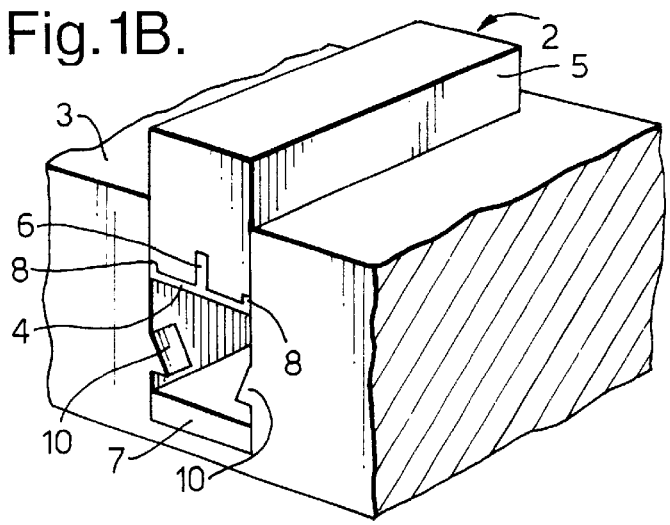
Figure 1C:
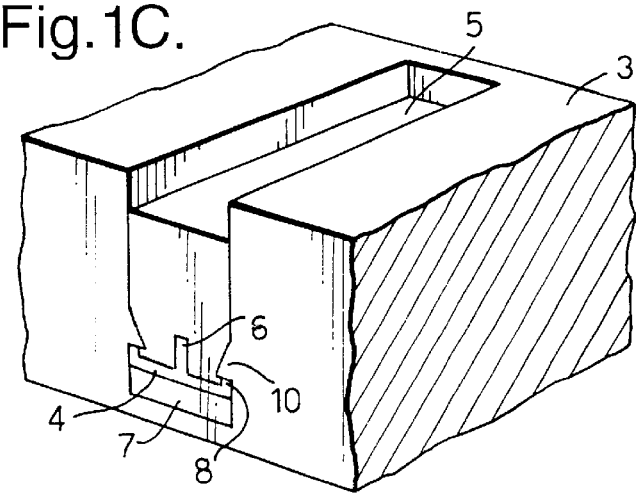

The attachment means 10 in the cavity 15 comprise protrusions on walls of the cavity, which project into the cavity. Upon pushing the sealing member 2 into the cavity 15, the carrier 4 slides over the shallow upper part of the attachment means 10 in the cavity, and the attachment means 8 of the carrier interlock with the attachment means 10 of the cavity, on the opposite side thereof (as shown in FIG. 1C). In this way, the sealing member 2 is retained in the cavity 15.

In the attached position shown in Figure IC, the sealing member 2 is able to move with respect to the object 3, in a direction further into, and subsequently in a direction towards the exterior of, the cavity 15. This is because the attachment means 10 of the cavity 15 are sufficiently spaced-apart from the base of the cavity to permit such movement. FIGS. 1B and 1C show a resilient member 7 located in the bottom of the cavity 15. When, in the attached position, the sealing member 2 is moved further into the cavity, the resilient member 7 is compressed. Due to its resilience, the compressed resilient member 7 exerts an opposite force on the sealing member, tending to force it towards the exterior of the cavity 15. The resilient member 7 illustrated in FIG. 1 comprises a strip of polymeric foam.

FIG. 2 shows another sealing member 2, and another resilient member 7. This sealing member 2 is similar to that shown in FIG. 1, except that the carrier 4 includes stiffening ribs 12, on the opposite side thereof to the sealant 5. The resilient member 7 comprises a leaf spring.

Figure 3A:
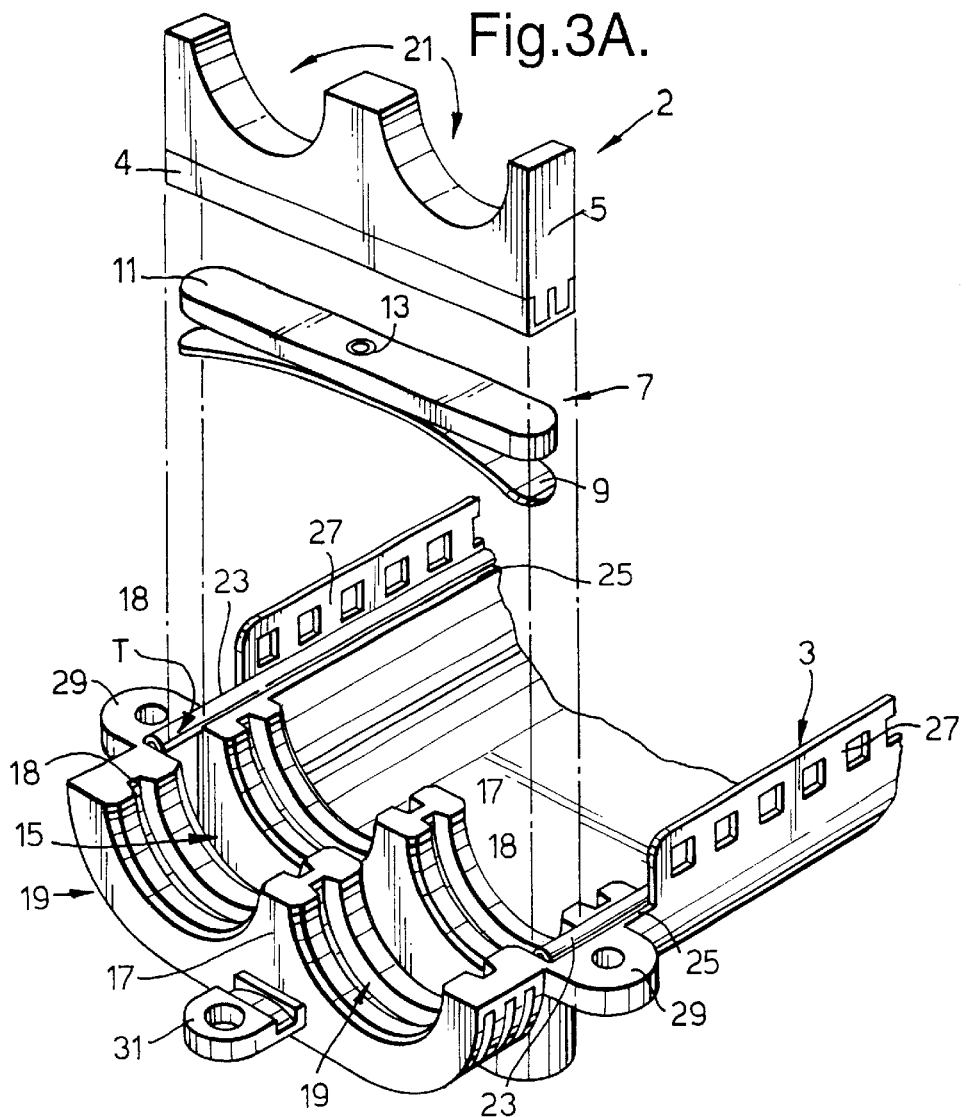
FIG. 3 is an illustration of part of a cable closure according to the invention.

FIG. 3A illustrates, in perspective, part of one housing part 3 of a cable closure 1 according to the invention. The housing part 3 comprises a half-shell which, in use, is brought together with another half-shell (not illustrated) to enclose a cable splice (for example). Also illustrated is a sealing member 2 comprising a block of sealant 5 (e.g. gel) and a carrier 4. A resilient member 7, comprising a leaf spring 9 and a plate 11 which are joined together by a rivet or other connection means 13, is also shown.

The housing part 3 includes a cavity 15 which comprises half of a complete cavity which is formed, in use, when the two housing parts are brought together. The cavity 15 is provided between first and second spaced apart walls 17, in which walls are provided two openings 19 through which cables may extend into the closure 1. As indicated by the dashed lines, the resilient member 7 is situated between the sealing member 2 and an internal wall of the cavity 15, and when the housing parts 3 are brought together around one or more cables, the sealing member 2 is compressed against the resilient member 7, thus causing the resilient member itself to be compressed, and consequently causing the resilient member, by its resilience, to apply a compressive force on the sealant 5. In the embodiment illustrated in FIG. 3, the other half-shell housing part (not illustrated) will also contain a sealing member 2 similar to that illustrated; it may or may not contain another resilient member 7 in addition to the one illustrated. The sealant blocks 5 include openings 21 for cables.

The half-shell housing part 3 illustrated in FIG. 3A includes two elongate sealing members 23, in the form of elastomeric tubes (e.g. formed from silicone rubber), which seal, in use, between the opposed longitudinal edge faces 25 of the two half-shell housing parts. The elongate sealing members 23 each sit in grooves provided in the longitudinal edge faces 25 of the housing parts. Where the longitudinal edge faces 25 are immediately adjacent to the cavity 15, they are narrower in transverse width (i.e. width transverse to the longitudinal, or cable, direction) than they are elsewhere. This. relative narrowness at the cavity 15 causes a portion of the length of each elongate sealing member 23 adjacent to the cavity to protrude transversely into the cavity. The narrowness of the edge faces 25 in the region of the cavity may be thought of as a removal of an internal portion (e.g. about halt) of the walls, which causes the elongate sealing members to protrude in a transverse direction into the cavity 15, preferably such that at least about a third, e.g. about a half, of their transverse cross-sectional area protrudes into the cavity. This has the advantage of increasing the contact area between the elongate sealing members 15 and the sealant 5 at the so-called triple points T (i.e the point of intersection of the longitudinal seals—i.e. the elongate sealing members 23—with the end seals—i.e. the sealant blocks 5). It also has the advantage of increasing the accessibility of the triple points T to the sealant 5, thus improving the penetration or wetting by the conformable sealant at the triple points.

The cable openings 19 in the spaced-apart walls 17 contain grooves 18, with which corresponding ridges in cable gripping strips wound around the cables interlock, in use, thereby securing the cables to the closure.

The two half-shell housing parts 3 illustrated in FIG. 3A may be joined together by means interlocking (e.g. snap-fit) connection means 27, i.e. resilient catches or protrusions on the other housing part (not shown) which interlock with the holes of the up-standing connection means 27 of the housing part 3 which is shown. However, generally any suitable connection means may be used, e.g. screws, bolts, clamps, catches etc. Furthermore, generally any combination of connection means may be used; for example screw-threaded parts 29 are provided on the housing part 3 illustrated in FIG. 3A, to ensure a tight connection between the two half-shell housing parts at the ends thereof, i.e. at the end seals and triple point seals. Attachment means, e.g. screw-thread part 31, may be provided to enable the closure to be attached to another structure, e.g. a wall or other support.

Figure 3B:
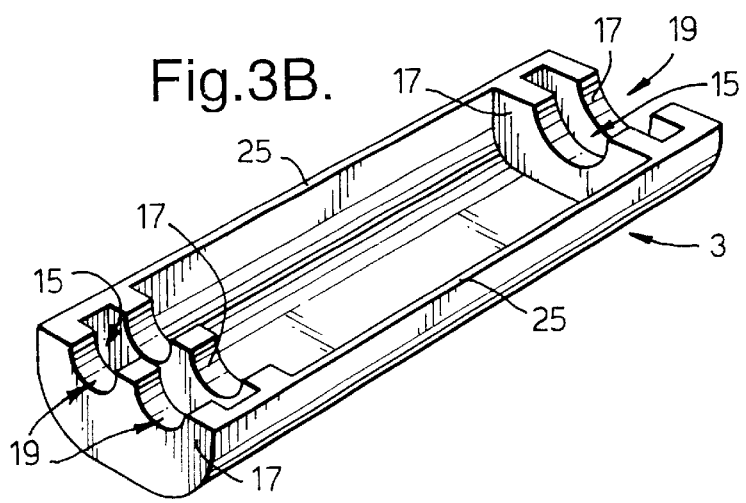

FIG. 3B illustrates, schematically, the full length of the half-shell housing part 3. The half-shell illustrated has two cable openings at one end, and one cable opening at the opposite end, but generally any combination of numbers of cable openings may be provided. Ordinarily between one and four openings will be provided at each end of the closure.

FIG. 4 illustrates part of another cable splice closure 1 according to the invention. This time, both half-shells 3 are illustrated.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A sealed article comprising:
   an object including a cavity formed therein, the cavity having a bottom wall and opposed side walls; and
   a sealing member, the sealing member comprising:
      a block of sealant having a lower surface; and
      a carrier including a backing strip having opposed inner and outer planar surfaces, wherein the inner surface faces the bottom wall and the block of sealant is attached to the outer surface by the lower surface thereof;
   wherein at least one of the carrier and the object includes attachment means whereby the carrier is configured to be attached to the object such that at least a portion of the sealant is retained within the cavity.

2. A sealed article according to claim 1, wherein the object includes at least a portion of a housing adapted for containing at least one member selected from the group consisting of an electrical conductor, an electrical connection, an electronic device, an optical fibre, and an optical device.

3. A sealed article according to claim 1 wherein the sealant comprises gel sealant.

4. A sealed article according to claim 1 wherein the attachment means includes mutually interlocking snap-fit parts forming a part of at least one of the carrier and the object, and wherein the sealing member is configured to be attached to the object by pushing the sealing member into the cavity until the snap-fit parts mutually interlock.

5. The sealed article according to claim 1 wherein the carrier includes at least one stiffening rib extending from the inner surface thereof.

6. The sealed article according to claim 1 wherein the carrier includes a protrusion extending from the outer surface of the backing strip and into the block of sealant to anchor the block of sealant to the carrier.

7. A cable closure for use with a cable, said cable closure comprising:
   a housing including an opening and a cavity, the cavity having a bottom wall and opposed side walls, each of the opening and the cavity configured such that the cable may extend therethrough; and
   a sealing member, the sealing member comprising:
      a block of sealant having a lower surface; and
      a carrier including a backing strip having opposed inner and outer planar surfaces, wherein the inner surface faces the bottom wall and the block of sealant is attached to the outer surface by the lower surface thereof;
   wherein at least one of the carrier and the housing includes attachment means whereby the carrier is configured to be attached to the housing such that at least a portion of the sealant is retained within the cavity.

8. A cable closure according to claim 7, wherein the carrier is attached directly to the housing by means of the attachment means whereby the sealing member is attached to the housing.

9. A cable closure according to claim 7 wherein the sealant comprises gel sealant.

10. A cable closure according to claim 7 wherein the attachment means includes mutually interlocking snap-fit parts forming a part of at least one of the carrier and the housing, and wherein the sealing member is configured to be attached to the housing by pushing the sealing member into the cavity until the snap-fit parts mutually interlock.

11. The cable closure according to claim 7 wherein the carrier includes at least one stiffening rib extending from the inner surface thereof.

12. The cable closure according to claim 7 wherein the carrier includes a protrusion extending from the outer surface of the backing strip and into the block of sealant to anchor the block of sealant to the carrier.

13. A sealed article comprising:
    an object including a cavity formed therein; and
    a sealing member, the sealing member comprising:
        sealant; and
        a carrier to which the sealant is attached;
    the sealed article further comprising a resilient member contained in the cavity and compressible by movement of the sealing member with respect to the object in at least one direction;
    wherein at least one of the carrier and the object includes attachment means whereby the carrier is configured to be attached to the object such that at least a portion of the sealant is retained within the cavity; and
    wherein the sealing member is moveable with respect to the object to which it is attached.

14. A sealed article according to claim 13 comprising a container including a housing, the object forming at least part of the housing, the housing comprising at least two housing parts which may be brought together, whereupon the sealing member is automatically moved with respect to the housing, thereby compressing the resilient member and causing the resilient member to apply a compressive force to the sealant.

15. A sealed article according to claim 14 wherein the cavity is configured such that a cable may extend therethrough and the resilient member is compressible in a direction substantially lateral to the direction in which the cable extends through the cavity when the cable is received in the cavity.

16. A sealed article according to claim 15 wherein the resilient member is compressible in a direction substantially perpendicular to the direction in which the cable extends through the cavity when the cable is received in the cavity.

17. A sealed article according to claim 15 wherein, when the cable is received in the cavity, the resilient member is laterally spaced apart from the cable and is positioned between the sealing member and at least one of the housing parts.

18. A sealed article according to claim 14 wherein the resilient member comprises at least one spring.

19. A sealed article according to claim 14 wherein the resilient member includes a resilient polymeric material.

20. A sealed article according to claim 14 wherein the housing parts are configured to be brought together to substantially enclose a cable splice.

21. A sealed article according to claim 14 wherein the housing parts include two half-shells.

22. A sealed article according to claim 14 including an elongate sealing member which seals between opposed edge faces of the housing parts, and which also sealingly contacts the sealant in the cavity.

23. The sealed article according to claim 13 wherein the carrier includes at least one stiffening rib.

24. The sealed article according to claim 13 wherein the carrier includes a protrusion extending into the sealant to anchor the sealant to the carrier.

25. A sealed article comprising:
    an object including a cavity formed therein, the cavity having a bottom wall and opposed side walls; and
    a sealing member, the sealing member comprising:
        a block of sealant having a lower surface; and
        a carrier including a backing strip having opposed inner and outer planar surfaces, wherein the inner surface faces the bottom wall and the block of sealant is attached to the outer surface by the lower surface thereof, the carrier including attachment means, the attachment means including at least one of a strip, a tape and a block adapted to attach the sealing member to the object such that at least a portion of the sealant is retained within the cavity.

26. The sealed article according to claim 25 wherein the carrier includes at least one stiffening rib extending from the inner surface thereof.

27. The sealed article according to claim 25 wherein the carrier includes a protrusion extending from the outer surface of the backing strip and into the block of sealant to anchor the block of sealant to the carrier.

28. A cable closure for use with a cable, said cable closure comprising:
    a housing including an opening and a cavity, each of the opening and the cavity configured such that the cable may extend therethrough; and
    a sealing member, the sealing member comprising:
        sealant; and
        a carrier to which the sealant is attached;
    the cable closure further comprising a resilient member contained in the cavity and compressible by movement of the sealing member with respect to the object in at least one direction;
    wherein at least one of the carrier and the housing includes attachment means whereby the carrier is configured to be attached to the housing such that at least a portion of the sealant is retained within the cavity; and
    wherein the sealing member is moveable with respect to the housing to which it is attached.

29. The cable closure according to claim 28 wherein the carrier includes at least one stiffening rib.

30. The cable closure according to claim 28 wherein the carrier includes a protrusion extending into the sealant to anchor the sealant to the carrier.

* * * * *